(No Model.)
B. H. COFFEY.
FILTER.
No. 417,405. Patented Dec. 17, 1889.
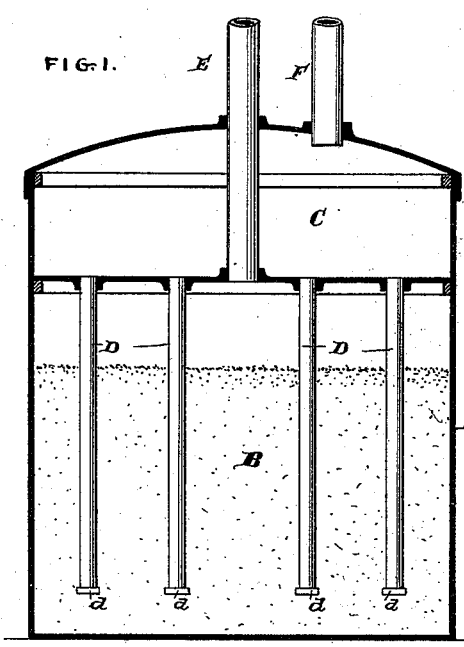
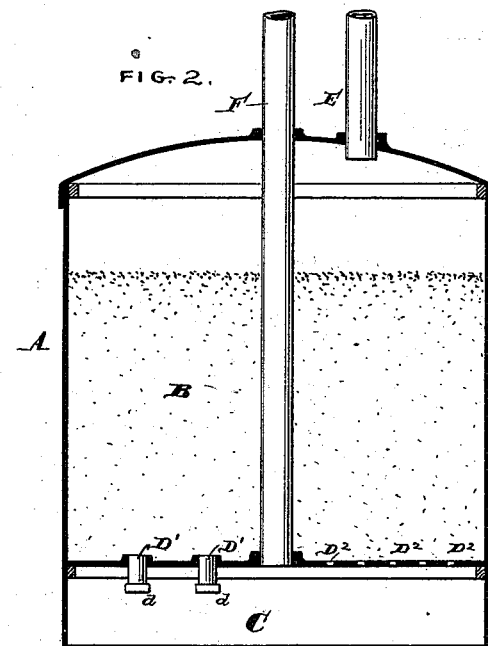
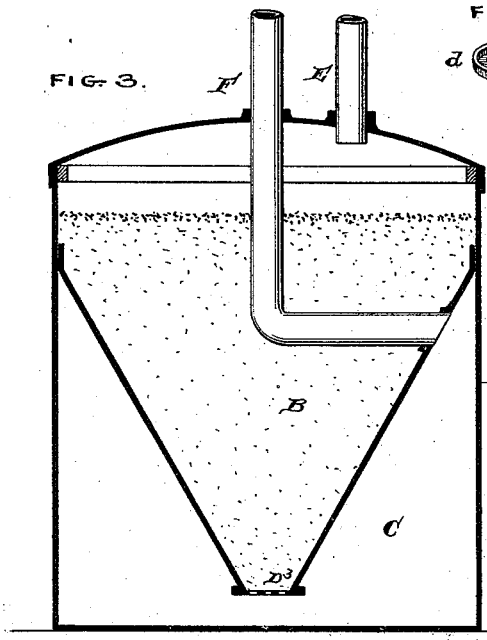
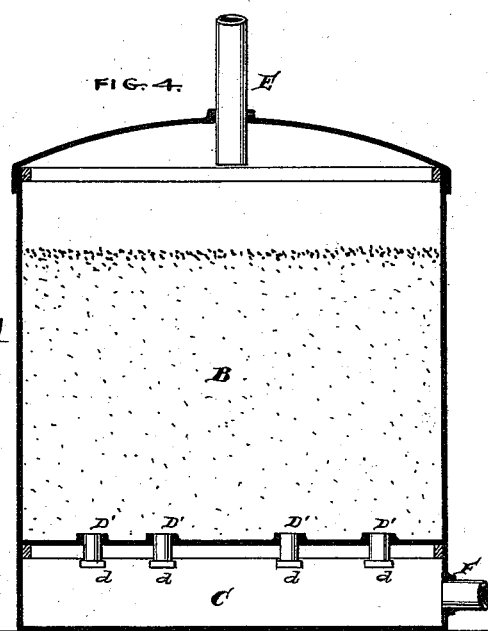
WITNESSES:
Henry Drury
David S. Williams
INVENTOR:
Barton H. Coffey
by his attorney
Francis T. Chambers

UNITED STATES PATENT OFFICE.

BARTON H. COFFEY, OF NEW YORK, N. Y.

FILTER.

SPECIFICATION forming part of Letters Patent No. 417,405, dated December 17, 1889.

Application filed April 12, 1889. Serial No. 306,932. (No model.)

*To all whom it may concern:*

Be it known that I, BARTON H. COFFEY, of the city of New York, county of New York, State of New York, have invented a new and useful Improvement in Filters, of which the following is a true and exact description, reference being had to the accompanying drawings, which form a part of this specification.

My invention relates to the construction of filters for purifying water in which a bed of sand is used as the filtering medium. In filters of this kind as heretofore constructed much difficulty has been met with in arranging the orifices through which the filtered water escapes from the filter-bed so as to prevent the sand from also escaping through the same orifices, and also owing to the tendency of these escape-passages and the parts immediately connected with them to become foul. A large number of devices known as "sand-valves" have been invented and used, the principle of all of them prior to my invention being, so far as I am aware, to interpose between the filter-chamber and the receptacle for the filtered water what might be called a "strainer"—that is, a device having orifices through which the water can pass, but which orifices are smaller than the sand particles and will not permit them to pass out with the water.

I have ascertained that wet sand placed in a receptacle having escape-orifices larger than the largest particles of sand and not substantially exceeding four times the diameter of such sand particles will for a very short time in very small quantity pass through such orifices with the current of water, and will then form an arch or dome over each of the orifices, effectually preventing the escape of any more sand, while still permitting the free escape of water through the interstices of the sand particles making up the dome. A filter-chamber constructed with escape-orifices of this character is cheaper to build than those having sand-valves of the usual more or less complicated character. It is less likely to get out of order, and the small quantity of sand which passes through the orifice has the effect of scouring the surface of the same and of any connecting-pipe, preventing the accumulation of any impurities on this part of the filter, and thus insure that no contamination shall be communicated to the water after it has passed through the bed of filter-sand.

Reference being now had to the drawings, which illustrate four different modifications of my invention, A in each drawing represents the casing of the filter; B, the filter-chamber containing sand; C, the receptacle for filtered water; D and D', Figs. 1, 2, and 4, pipes connecting the filter-chamber with the filtered-water receptacle, the pipes D, Fig. 1, leading upward from near the bottom of the filter-chamber through a receptacle for filtering water situated above the filter-chamber, and the pipes D', Figs. 2 and 4, leading downward from the filter-chamber to the receptacle for filtered water beneath the bottom of the same.

$D^2$, Figs. 2 and 3, represent escape-orifices formed in the bottom of the filter-chamber and connecting it with the receptacle for filtered water.

$d$ is a cap arranged to screw onto the ends of the pipes D and D', and having orifices formed in it, as shown in the perspective view, Fig. 5.

E in each of the figures is a supply-pipe through which the water enters the filter-chamber to be filtered, and F is the delivery-pipe through which the filtered water is conducted away from the filter.

The construction shown in Fig. 1 of the drawings, in which the pipes D lead from near the bottom of the filter-chamber into a settling-chamber and open at the bottom of said settling-chamber, has the special advantage that the sand escaping through the orifices at the bottom of said pipes is deposited in little rings around the mouths of the pipes in the settling-chamber, and when the current of water is reversed to clean the filter the sand is sucked down into the pipes D, and, passing through the perforations at their bottoms, enters again into the filtering-chamber; and this special construction forms the subject-matter of another application for Letters Patent filed by me May 16, 1888, and bearing the Serial No. 274,044.

The advantage of having the orifices formed immediately in the bottom plate of the sand-chamber, as is shown in Fig. 2 at $D^2$ and in Fig. 3 at $D^3$, is that by this construction I am enabled to dispense with the pipe-sections, as shown in the other figures. This construction of course is only practicable where the water-reservoir is below the sand-chamber.

The leading feature in all of the various modifications shown is the formation of the orifices through which the water escapes so that they shall be larger than the largest particles of sand and not substantially exceed four times the diameter of such sand particles. While it is desirable that provision should be made by which the small quantity of sand escaping through the orifices when the filter is started should be returned to the filter when the current of water is reversed, the quantity so escaping is so small that this is not necessary, and in all constructions the great advantages already mentioned—to wit, the simplicity of the construction and the scouring out of the orifice-passages—are attained. In using sand of a size which will pass through a sieve having openings one-sixteenth of an inch in size I have discovered that the orifices in the filter-chamber are not efficient when three thirty-seconds of an inch in diameter.

Having now described my invention, what I claim as new, and desire to secure by Letters Patent, is—

1. In a filter, the combination of a filter-chamber adapted to contain sand, and receptacle for filtered water, with communicating orifices of greater diameter than the larger particles of sand, substantially as and for the purpose specified.

2. In a filter, the combination of a filter-chamber adapted to contain sand, a receptacle for filtered water situated below the filter-chamber, and a plate serving at the bottom of the filter-chamber and top of said water-chamber, with orifices formed in it of greater diameter than the larger particles of sand, substantially as and for the purpose specified.

BARTON H. COFFEY.

Witnesses:
LEWIS R. DICK,
FRANCIS T. CHAMBERS.